(12) United States Patent
Lee et al.

(10) Patent No.: US 12,541,892 B2
(45) Date of Patent: Feb. 3, 2026

(54) PRE-PROCESSING DEVICE FOR IMAGE REPRESENTING MANUFACTURING SYSTEM STATE AND METHOD USING SAME

(71) Applicant: VMS Solutions Co. Ltd., Yongin-si (KR)

(72) Inventors: Won Jun Lee, Daejeon (KR); Tae Jun Choi, Incheon (KR); Goo Hwan Chung, Yongin-si (KR); Geon A Kim, Seoul (KR); Jin-Yeong Jeong, Goyang-si (KR)

(73) Assignee: VMS Solutions Co. Ltd., Yongin-si (KR)

( * ) Notice: Subject to any disclaimer, the term of this patent is extended or adjusted under 35 U.S.C. 154(b) by 149 days.

(21) Appl. No.: 18/502,552

(22) Filed: Nov. 6, 2023

(65) Prior Publication Data

US 2024/0153175 A1    May 9, 2024

(30) Foreign Application Priority Data

Nov. 7, 2022    (KR) .......................... 10-2022-0147121

(51) Int. Cl.
*G06T 15/00* (2011.01)
*G05B 19/418* (2006.01)
*G06T 11/20* (2006.01)

(52) U.S. Cl.
CPC ........ *G06T 11/206* (2013.01); *G05B 19/4183* (2013.01); *G05B 19/41865* (2013.01); *G05B 19/41885* (2013.01)

(58) Field of Classification Search
CPC .............. G06T 11/206; G05B 19/4183; G05B 19/41865; G05B 19/41885
See application file for complete search history.

(56) References Cited

U.S. PATENT DOCUMENTS

| 5,303,144 A * | 4/1994 | Kawashima ....... G06Q 10/0637 700/99 |
| 6,282,514 B1 * | 8/2001 | Kumashiro ........ G06Q 10/0633 705/7.11 |
| 12,142,081 B2 * | 11/2024 | Nakayama ............. G06V 20/52 |
| 12,158,744 B2 * | 12/2024 | Yoshii .............. G06Q 10/06398 |
| 12,265,930 B2 * | 4/2025 | Nishimura ....... G06Q 10/06398 |

(Continued)

FOREIGN PATENT DOCUMENTS

| DE | 10112438 A1 * | 10/2002 | ......... G05B 19/0426 |
| JP | 2000020048 A * | 1/2000 | |

(Continued)

*Primary Examiner* — Cheng Yuan Tseng
(74) *Attorney, Agent, or Firm* — Sughrue Mion, PLLC

(57) ABSTRACT

A manufacturing system state image preprocessing device in accordance with one embodiment of the present disclosure includes: a basic image generator configured to generate a basic image that visually represents a manufacturing system state based on manufacturing system state data, wherein the basic image includes a Gantt chart; and a conditioned image generator configured to generate one or more conditioned images in which one or more sets of conditions have been applied to the basic image, wherein an output image including at least one of the basic image and the one or more conditioned images is provided as input to an artificial neural network module.

16 Claims, 6 Drawing Sheets

(56) References Cited

U.S. PATENT DOCUMENTS

| | | | |
|---|---|---|---|
| 2019/0377602 A1* | 12/2019 | Mosca | G06Q 10/0635 |
| 2022/0171908 A1* | 6/2022 | Sawahata | G05B 19/41885 |
| 2022/0230440 A1* | 7/2022 | Fujimoto | G06V 20/52 |
| 2022/0342375 A1* | 10/2022 | Wang | G05B 19/058 |
| 2022/0405866 A1* | 12/2022 | Watanabe | G06Q 50/04 |
| 2023/0010844 A1* | 1/2023 | Bagheri | G06Q 10/06314 |
| 2023/0027840 A1* | 1/2023 | Wang | G06F 18/2433 |
| 2023/0195439 A1* | 6/2023 | Egger | G06F 8/452 |
| | | | 717/150 |
| 2024/0168450 A1* | 5/2024 | Wang | G05B 19/058 |

FOREIGN PATENT DOCUMENTS

| | | |
|---|---|---|
| JP | 2007-094981 A | 4/2007 |
| JP | 2015-138321 A | 7/2015 |
| KR | 10-2086005 B1 | 4/2020 |
| KR | 10-2020-0143821 A | 12/2020 |
| KR | 10-2021-0099932 A | 8/2021 |
| KR | 10-2342476 B1 | 12/2021 |
| KR | 10-2439163 B1 | 9/2022 |

\* cited by examiner

FIG. 2

Basic image (15)

|     | 22-07-19 | 22-07-20 | 22-07-21 | 22-07-22 | 22-07-23 |
|-----|----------|----------|----------|----------|----------|
| M01 | JOB01    | JOB03    | SETUP / JOB04 | | JOB07 |
| M02 | JOB02    | JOB05    | JOB06    | JOB08 / JOB09 | JOB10 |
| M03 | JOB12    |          |          | JOB13    |          |
| M04 | JOB14    |          |          | SETUP    | JOB15    |

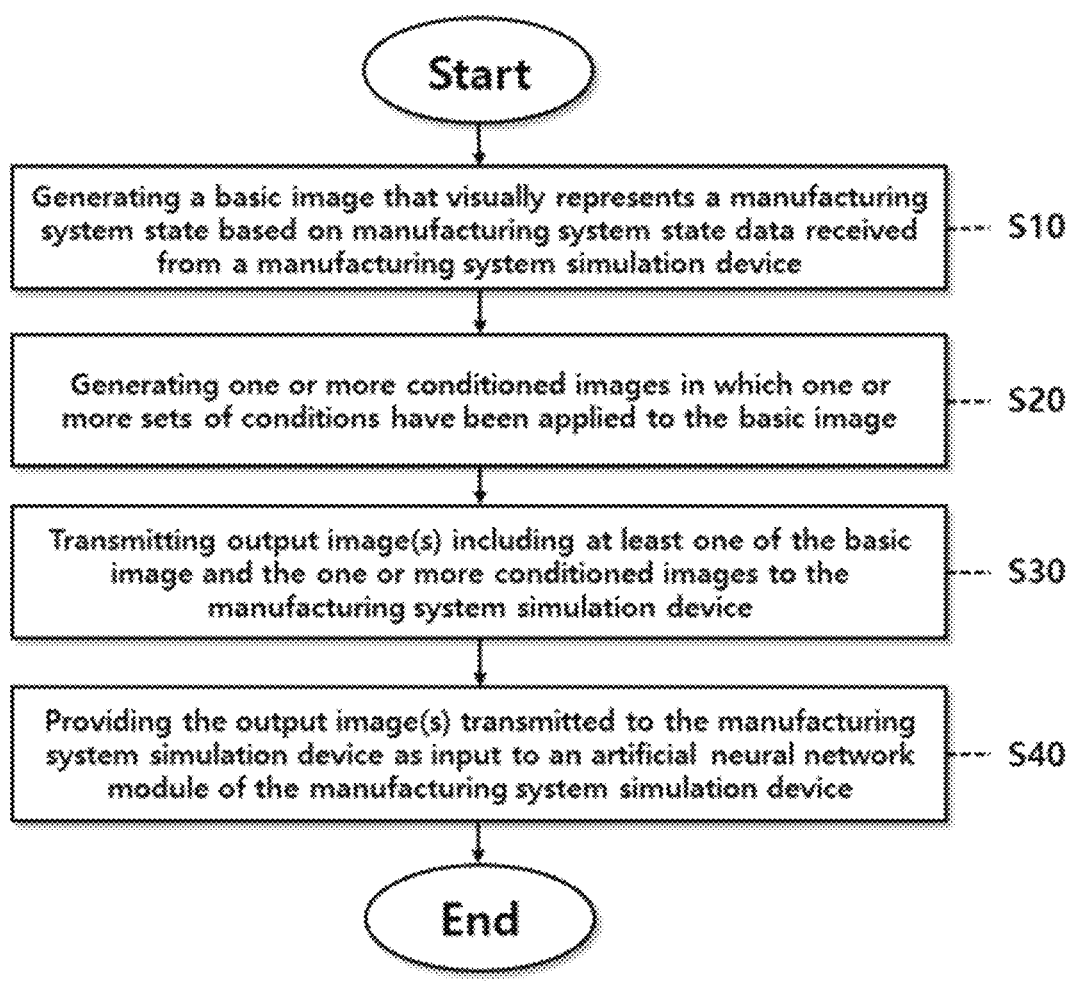

PRE-PROCESSING DEVICE FOR IMAGE REPRESENTING MANUFACTURING SYSTEM STATE AND METHOD USING SAME

CROSS-REFERENCE TO RELATED APPLICATION

This application claims priority under 35 U.S.C § 119 to Korean Patent Application No. 10-2022-0147121, filed on Nov. 7, 2022, in the Korean Intellectual Property Office, the entire contents of which is hereby incorporated by reference.

TECHNICAL FIELD

The present disclosure relates to a preprocessing device for an image representing a manufacturing system state and a method using the same, and more particularly, to a device for preprocessing an image such as a Gantt chart representing the state of a manufacturing system and a method of using the same.

BACKGROUND

Manufacturing systems, for example, semiconductor manufacturing plants (Fabs), are among the most sophisticated man-made systems, and generally consist of hundreds or thousands of expensive pieces of equipment connected to an automated resource processing system. Establishing an optimal work schedule in a manufacturing system consisting of such a large number of pieces of equipment can significantly improve manufacturing system productivity.

However, in order to arrange work schedules for many pieces of equipment that were previously deployed in a manufacturing system, it relied on heuristic solutions based on parameters tuned by humans, such as experts, but this method has drawbacks that it requires human intervention each time to set up a work schedule in the manufacturing system, which can limit the operational efficiency of the manufacturing system.

In particular, it is clear that the heuristic solutions by humans as described above have limitations in establishing a dispatching strategy for selecting and ordering available jobs to be performed at each workplace, and there is an urgent need to develop and distribute alternative methods that can compensate for this.

Meanwhile, recent success examples in artificial intelligence in various fields such as autonomous driving and communications are often based on extracting meaningful features from the geometric relationships between pixels included in images. In light of this, there is a growing demand for methods to more efficiently implement dispatching strategies in the environment within a manufacturing system by imaging the manufacturing system state and applying these images to an artificial neural network.

Jobs that are completed through several processes in a manufacturing system can be processed quickly or slowly depending on the equipment state of the process that follows. Since the information included in a Gantt chart provides a comprehensive view of the time points at which jobs are processed in the equipment, the geometric relationship is meaningful information in improving the flow of job processing.

SUMMARY

Therefore, it is one object of the present disclosure to generate image data that visually represents a manufacturing system state and preprocess the generated image into a form from which meaningful features can be extracted in an artificial neural network module or the like, so as to be usable for analysis of various states of the manufacturing system.

However, the objects to be achieved by the present disclosure are not limited to those mentioned above, and may include objects that have not been mentioned but can be clearly understood by those of ordinary skill in the art to which the present disclosure pertains from the description below.

In the following, specific means for achieving the objects of the present disclosure will be described.

A manufacturing system state image preprocessing device in accordance with one embodiment of the present disclosure comprises: a basic image generator configured to generate a basic image that visually represents a manufacturing system state based on manufacturing system state data, wherein the basic image comprises a Gantt chart; and a conditioned image generator configured to generate one or more conditioned images in which one or more sets of conditions have been applied to the basic image, wherein an output image comprising at least one of the basic image and the one or more conditioned images are provided as input to an artificial neural network module.

In the manufacturing system state image preprocessing device described above, each row of the Gantt chart represents equipment, columns of the Gantt chart represent time, and each of a plurality of bars included in the Gantt chart comprises at least one of a job and a setup time.

In the manufacturing system state image preprocessing device described above, the Gantt chart of the basic image is displayed to include three or more colors, and the Gantt chart of the one or more conditioned images is displayed to include two colors.

In the manufacturing system state image preprocessing device described above, the one or more sets of conditions comprise at least one of a product type condition, a due date condition, and a setup time condition, and the one or more conditioned images comprise at least one of a first conditioned image in which the product type condition has been applied, a second conditioned image in which the due date condition has been applied, and a third conditioned image in which the setup time condition has been applied.

In the manufacturing system state image preprocessing device described above, the basic image generator further receives input parameters from a user device, and the basic image is generated further based on the input parameters, and the input parameters comprise at least one of a window size parameter for defining a size of a Gantt chart image for the basic image, a sampling interval parameter indicative of a time interval at which samples are extracted when sampling Gantt chart images at several time points, and a sampling count parameter that specifies how many times Gantt chart images are to be extracted at a sampling interval.

A manufacturing system state image preprocessing method in accordance with one embodiment of the present disclosure comprises: generating a basic image that visually represents a manufacturing system state based on manufacturing system state data, wherein the basic image comprises a Gantt chart; generating one or more conditioned images in which one or more sets of conditions have been applied to the basic image; and transmitting an output image comprising at least one of the basic image and the one or more conditioned images to a manufacturing system simulation device, wherein the output image is provided as input to an artificial neural network module.

In the manufacturing system state image preprocessing method described above, each row of the Gantt chart represents equipment, columns of the Gantt chart represent time, and each of a plurality of bars included in the Gantt chart comprises at least one of a job and a setup time.

A manufacturing system state simulation system in accordance with one embodiment of the present disclosure comprises: a manufacturing system simulation device configured to generate manufacturing system state data indicative of a progress state of processes performed by a number of pieces of equipment in a manufacturing system and generate manufacturing system simulation data for simulating a workflow of the manufacturing system; and a manufacturing system state image preprocessing device comprising a basic image generator configured to generate a basic image that visually represents a manufacturing system state based on the manufacturing system state data received from the manufacturing system simulation device, wherein the basic image comprises a Gantt chart; and a conditioned image generator configured to generate one or more conditioned images in which one or more sets of conditions have been applied to the basic image, wherein an output image comprising at least one of the basic image and the one or more conditioned images are transmitted from the manufacturing system state image preprocessing device to the manufacturing system simulation device and provided as input to an artificial neural network module of the manufacturing system simulation device, and the artificial neural network module processes the output image and generates the manufacturing system simulation data.

In the manufacturing system state simulation system described above, the artificial neural network module of the manufacturing system simulation device is based on reinforcement learning, and outputs the manufacturing system simulation data based on at least one of the output image and dispatching rules provided as input to the artificial neural network module.

In the manufacturing system state simulation system described above, the dispatching rules comprise at least one of: a FIFO (first in, first out) rule, which is a rule that processes jobs that arrive earlier than other jobs first; an SPT (shortest processing time)/LPT (longest processing time) rule, which is a rule that processes jobs with shorter/longer processing times than other jobs first; a setup rule, which is a rule that does not process jobs that cause setup changes first; a required Eqd rule, which is a rule that processes jobs based on the ratio of equipment with tool settings for the jobs relative to a total number of pieces of equipment at a current station; a queue time rule, which is a rule that processes jobs closer to a predefined queue time limit first; a target data rule, which is a rule that processes jobs closer to a predefined deadline first; and a layer change rule, which is a rule that does not process jobs first if the jobs cause layer changes.

As described above, there are the following effects according to the present disclosure.

The manufacturing system state image preprocessing device in accordance with one embodiment of the present disclosure has the effect of enabling a dispatching strategy to be implemented more efficiently in the environment within the manufacturing system via an image analysis-based artificial neural network module in a DEVS-based manufacturing system simulation device by performing an image preprocessing process to generate a basic image that visually represents the manufacturing system state and one or more conditioned images and providing the preprocessed output image to the DEVS-based manufacturing system simulation device.

However, the effects that can be obtained with the present disclosure are not limited to those mentioned above, and other effects that have not been mentioned will be clearly understood by those of ordinary skill in the art to which the present disclosure pertains from the description below.

BRIEF DESCRIPTION OF THE DRAWINGS

As the following drawings accompanying the present specification illustrate preferred embodiments of the present disclosure and serve to help further understand the technical idea of the present disclosure together with the detailed description of the present disclosure, the present disclosure should not be construed as being limited to those described in such drawings.

FIG. 2 is an example diagram of a basic image generated by a manufacturing system state image preprocessing device in accordance with one embodiment of the present disclosure;

FIG. 6 is a flowchart of a manufacturing system state image preprocessing method in accordance with one embodiment of the present disclosure.

DETAILED DESCRIPTION OF THE PREFERRED EMBODIMENTS

Figure 1:
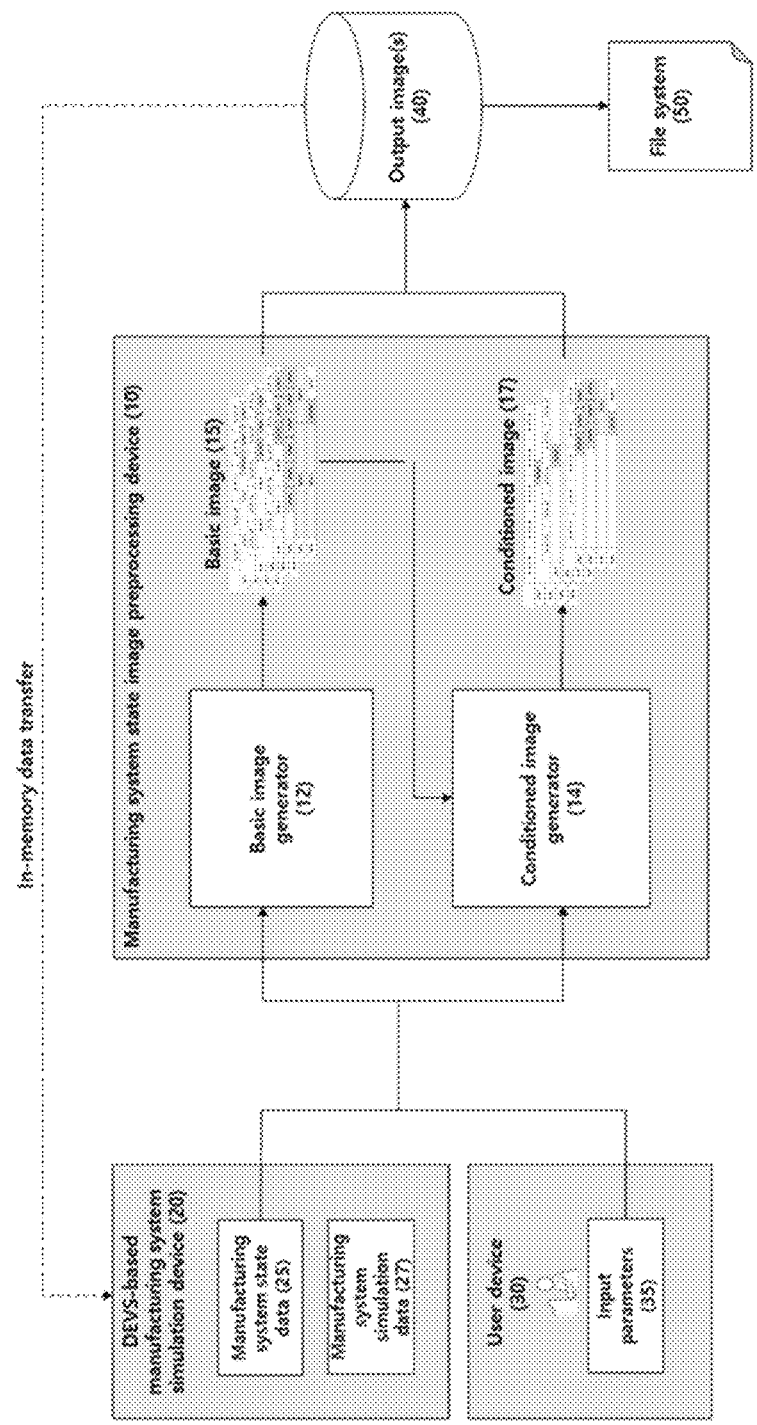
FIG. 1 is a diagram schematically showing a manufacturing system state simulation system including a manufacturing system state image preprocessing device in accordance with one embodiment of the present disclosure.

Hereinafter, embodiments that enable those of ordinary skill in the art to which the present disclosure pertains to readily implement the present disclosure will be described in detail with reference to the accompanying drawings. However, the present disclosure may be embodied in a number of different forms and is not limited to the examples described herein. Further, in describing the operating principle of the preferred embodiments of the present disclosure in detail, if it is determined that a detailed description of related known functions or configurations may unnecessarily obscure the subject matter of the present disclosure, the detailed description thereof will be omitted.

In addition, the same reference numerals will be used for parts that serve for similar functions and actions throughout the drawings. Throughout the specification, when a certain part is said to be connected to or above/below another part, this includes not only the case of being directly connected or above/below, but also the case of being indirectly connected or above/below with yet another component interposed therebetween.

Furthermore, when a part is said to "include" a component throughout the specification, this does not mean to exclude other components but means that it may further include other components unless specifically stated to the contrary.

Terms such as "first" and "second" may be used to describe various components, but these components should not be limited by such terms. That is, the terms are used only for the purpose of distinguishing one component from another. For example, a first component may be named a second component, and similarly, a second component may be named a first component, without departing from the scope of the present disclosure. The descriptions "and/or" and "/" include any combination of a plurality of related listed items or any one of a plurality of related listed items.

In addition, unless specifically stated otherwise, "singular" expressions are used herein to include one or more entities. Lastly, as used herein, "or" means a non-exclusive "or" unless specifically stated otherwise.

Further, as the terms used in the present disclosure, common terms that are currently widely used as much as possible while taking into account the functions in the present disclosure have been selected, but this may vary depending on the intentions of technicians working in the field, judicial precedents, the emergence of new technology, and the like. In addition, there are also terms arbitrarily selected by the applicant in particular cases, in which case the meaning will be described in detail in the relevant description of the disclosure. Therefore, the terms used in the present disclosure should be defined based on the meanings of the terms and the overall contents of the present disclosure, rather than simple names of the terms.

Overview of Manufacturing System State Simulation System

FIG. 1 is a diagram schematically showing a manufacturing system state simulation system including a manufacturing system state image preprocessing device in accordance with one embodiment of the present disclosure.

Referring to FIG. 1, a system including a manufacturing system state image preprocessing device 10 in accordance with one embodiment of the present disclosure may include the manufacturing system state image preprocessing device 10, a discrete event simulation ("DEVS") manufacturing system simulation device 20, a user device 30, and a file system 50. The manufacturing system state image preprocessing device 10 and the DEVS manufacturing system simulation device 20 may be software modules implemented by executing computer-executable instructions by a processor of a computing device or server device installed in the manufacturing system, or may be constructed as separate hardware modules, or a combination of the two, but are not limited thereto.

According to one embodiment, the manufacturing system state image preprocessing device 10 may include a basic image generator 12 and a conditioned image generator 14. The basic image generator 12 may receive manufacturing system state data 25 from the discrete event simulation ("DEVS") module 20 and input parameters 35 from the user device 30, and may generate a basic image 15 representing the manufacturing system state based on at least one of the manufacturing system state data 25 and the input parameters 35. According to one embodiment, such a basic image 15 may be a Gantt chart image, which will be described in detail later.

The conditioned image generator 14 may receive the input parameters 35 from the user device 30 and the basic image 15 from the basic image generator 12. And one or more conditioned images 17 may be generated by extracting one or more sets of conditions from the received input parameters 35 and then applying the extracted set of conditions to the basic image 15. According to one embodiment, the set of conditions may include at least one of a product type condition, a due date condition, and a setup time condition, but is not limited thereto.

Output image(s) 40 generated by the manufacturing system state image preprocessing device 10, i.e., the basic image 15 and/or the conditioned images 17, may be stored in the file system 50, and may also be provided to the DEVS-based manufacturing system simulation device 20. The output image(s) 40 may be transferred to the DEVS-based manufacturing system simulation device 20 not only at a time point after the end of the manufacturing system simulation but also at time points during the manufacturing system simulation. The DEVS-based manufacturing system simulation device 20 may utilize the output image(s) 40 in real time for simulation.

The DEVS manufacturing system simulation device 20 may generate manufacturing system state data 25 indicative of the progress states of processes performed by a number of pieces of equipment in the manufacturing system. The manufacturing system state data 25 may be for an actual manufacturing system or for a virtual manufacturing system that simulates an actual manufacturing system (e.g., implemented with digital twin technology).

In addition, the DEVS manufacturing system simulation device 20 may receive and use the output image(s) 40 from the manufacturing system state image preprocessing device 10. To this end, the DEVS manufacturing system simulation device 20 may include a real-time dispatcher RTD or real-time scheduler for job scheduling, i.e., dispatching, to pieces of equipment in the manufacturing system. Such a real-time dispatcher RTD or real-time scheduler may include a dispatcher, and the dispatcher may include an artificial neural network module and output a dispatching strategy through reinforcement learning. At this time, the dispatcher may perform reinforcement learning using the output image(s) 40 provided from the manufacturing system state image preprocessing device 10 and generate manufacturing system production plan (schedule) data 27 based thereon. Further, the output image(s) 40 may be used to determine whether a manufacturing system schedule anomaly has occurred. Here, the definition of the schedule anomaly may be edited by the user. It may be used as input to train and evaluate an automatic anomaly detector.

The user device 30 may be one or more user devices of a manager who manages and oversees the manufacturing system, and may be various devices such as, for example, a PC, a mobile phone, a tablet, a laptop, or a PDA. The manager may input the input parameters 35 via the user device 30 and transmit them to the manufacturing system state image preprocessing device 10. The input parameters 35 are parameters to be considered when generating the basic image 15 that visually represents the manufacturing system state, and may include at least one of a window size, a sampling interval, and a sampling count for the basic image 15. Further, the manager may input a set of conditions to be applied to the basic image in the conditioned image generator 14 via the user device 30. Meanwhile, as the input parameters 35 and the set of conditions are set to default, the basic image 15 and the conditioned images 17 may be generated in default values if there is no separate input from the user.

The file system 50 may be a database that stores the output image(s) 40 generated by the manufacturing system state image preprocessing device 10, i.e., the basic image 15 and the conditioned images 17. The file system 50 may log and store predetermined data indicative of the manufacturing system states, in addition to the output image(s) 40.

Hereinafter, each component of a system including an image preprocessing device for simulating a manufacturing system state in accordance with one embodiment of the present disclosure will be described in detail.

DEVS-Based Manufacturing System Simulation Device

Referring to FIG. 1, the DEVS-based manufacturing system simulation device 20 in accordance with one embodiment of the present disclosure may generate manufacturing system state data 25 and manufacturing system production plan (schedule) data 27. However, the manufacturing system state data 25 and the manufacturing system production plan (schedule) data 27 are described distinctively for convenience, but the two pieces of data may correspond to the same data.

According to one embodiment of the present disclosure, the DEVS manufacturing system simulation device 20 performs DEVS, i.e., discrete event simulation on the manufacturing system state. That is, in an actual manufacturing system, decisions (e.g., dispatching actions, etc.) are not made at regular time intervals but rather at non-regular time intervals in continuous time periods, and the DEVS manufacturing system simulation device 20 may generate the manufacturing system production plan (schedule) data 27 specialized for such a manufacturing system state. As one example, the DEVS manufacturing system simulation device 20 may include a real-time dispatcher RTD or real-time scheduler for dispatching, and may be designed to make decisions in real time, at preset time intervals (periods), or when a certain event occurs.

The manufacturing system state data 25 may include data indicative of the progress states of processes performed by a number of pieces of equipment in an actual manufacturing system. As one non-limiting example, the manufacturing system state data 25 may include information on manufacturing system resources such as whether each of the pieces of equipment within the manufacturing system is operating and the like, the type and number of each of the processes being processed by the respective pieces of equipment in operation, the type, number, and delivery date of each of the products and jobs, a waiting time, a processing time, a setup time for each process, and the like.

Further, optionally, the manufacturing system state data 25 may also include information on a plurality of demands, information on priorities of demands, information on priorities of equipment, information on time constraint(s) of resources, information on simulations, etc. Here, a demand may be a request by a customer, and may include at least information such as an item (e.g., TV), a quantity (e.g., 1000 pieces), a delivery date (e.g., January 5th), an availability of early delivery before the delivery date (e.g., impossible), and a delivery destination (e.g., XX Electronics).

Meanwhile, according to one embodiment of the present disclosure, the DEVS manufacturing system simulation device 20 may receive the output image(s) 40 generated from the manufacturing system state image preprocessing device 10, i.e., the basic image 15 that visually represents the manufacturing system state and conditioned images 17, in an in-memory data transfer method, for example. And the DEVS manufacturing system simulation device 20 may generate manufacturing system production plan (schedule) data 27 based at least in part on the received output image(s) 40. Alternatively, in another example, the DEVS manufacturing system simulation device 20 may also determine whether a manufacturing system schedule anomaly has occurred based on the output image(s) 40.

According to one embodiment of the present disclosure, the DEVS manufacturing system simulation device 20 may include an artificial neural network module, and as one example, the artificial neural network module may output and generate the manufacturing system production plan (schedule) data 27 or determine whether a manufacturing system schedule anomaly has occurred by performing a reinforcement learning or pre-learning process with the output image(s) 40 as an input value. The artificial neural network module may be implemented using at least one of a CNN (convolution neural network), YOLO (you only look once), LSTM (long-short term memory), an RNN (recurrent neural network), a transformer, a GAN (generative adversarial network), and an AE (autoencoder), but is not limited thereto.

Manufacturing System State Image Preprocessing Device

Referring to FIG. 1, the manufacturing system state image preprocessing device 10 in accordance with one embodiment of the present disclosure may include the basic image generator 12 and the conditioned image generator 14.

First, the basic image generator 12 may receive the manufacturing system state data 25 from the DEVS simulation module 20 and the input parameters 35 from the user device 30, and may generate a basic image 15 that visually represents the manufacturing system state based on at least one of the manufacturing system state data 25 and the input parameters 35.

FIG. 2 is an example diagram of a basic image generated by a manufacturing system state image preprocessing device in accordance with one embodiment of the present disclosure.

Referring to FIG. 2, the basic image 15 in accordance with one embodiment may be a Gantt chart, and the rows of the Gantt chart may represent equipment M01, M02, M03, and M04, the columns may represent times 22 Jul. 19, 22 Jul. 20, 22 Jul. 21, 22 Jul. 22, and 22 Jul. 23 (where 22 Jul. 19 represents Jul. 19, 2022), and the respective bars included in the chart may correspond to jobs JOB1 to JOB15 or setup times. In other words, the basic image 15 is a Gantt chart, which visually and geometrically expresses for which jobs each equipment performs processes by time and/or has occurred at setup times.

Although the example in FIG. 2 shows jobs only for the period from 22 Jul. 19 to 22 Jul. 23 for four pieces of equipment M01, M02, M03, and M04 in the Gantt chart within the basic image, there may exist hundreds to thousands of pieces of equipment in an actual manufacturing system and products may need to go through hundreds of process steps, or jobs, and thus, it is necessary to define the equipment, time, job, and the like that the basic image encompasses. In addition, it is necessary to define the number of times the basic images are generated and the like according to the time point of the generation of manufacturing system simulation data necessary for stable operation of the actual manufacturing system.

Therefore, the basic image generator 12 may use the input parameters 35 received from the user device 30 in order to define the range for generating such a Gantt chart. The input parameters 35 may include, for example, at least one of a window size, a sampling interval, and a sampling count. As one example, the input parameters 35 may include all of the window size, the sampling interval, and the sampling count. Here, the window size is a parameter for defining the size of the Gantt chart image, and may include real values indicative of the number of each of the rows and columns. The sampling interval is a parameter indicative of the time interval at which samples are extracted when sampling Gantt chart images at several time points, and may include a real value representing time. The sampling count is a parameter that specifies how many times the Gantt chart images are to be extracted at the sampling interval, and may include an integer value representing the number of times the image is extracted. When sampling Gantt chart images at several time points, the basic image may include a plurality of Gantt chart images sampled at several time points.

Further, optionally, the input parameters 35 may also include a parameter indicative of whether the basic image has been extracted. For example, if the value of the corresponding parameter is True (or "1"), one or more conditioned images may be generated by applying a set of conditions to the basic image after generating the basic image. In addition, if the value of the corresponding parameter is False (or "0"), one or more conditioned images in which a set of conditions has been applied may be generated directly without generating a basic image. As a non-limiting example, the basic image may be made up of two or more colors, and the conditioned images may be generated as black and white images since only data that meets the set of conditions will remain.

Further, although the rows and columns of the Gantt chart that serves as the basic image are configured with equipment and time, respectively, and the bars are configured with jobs and setup times in the example of FIG. 2, the form of the Gantt chart may be created differently if necessary. The form of such a Gantt chart may be adjusted by the manager of the user device 30 via the input parameters 35, and there is no limitation in its specific form.

Figure 3:
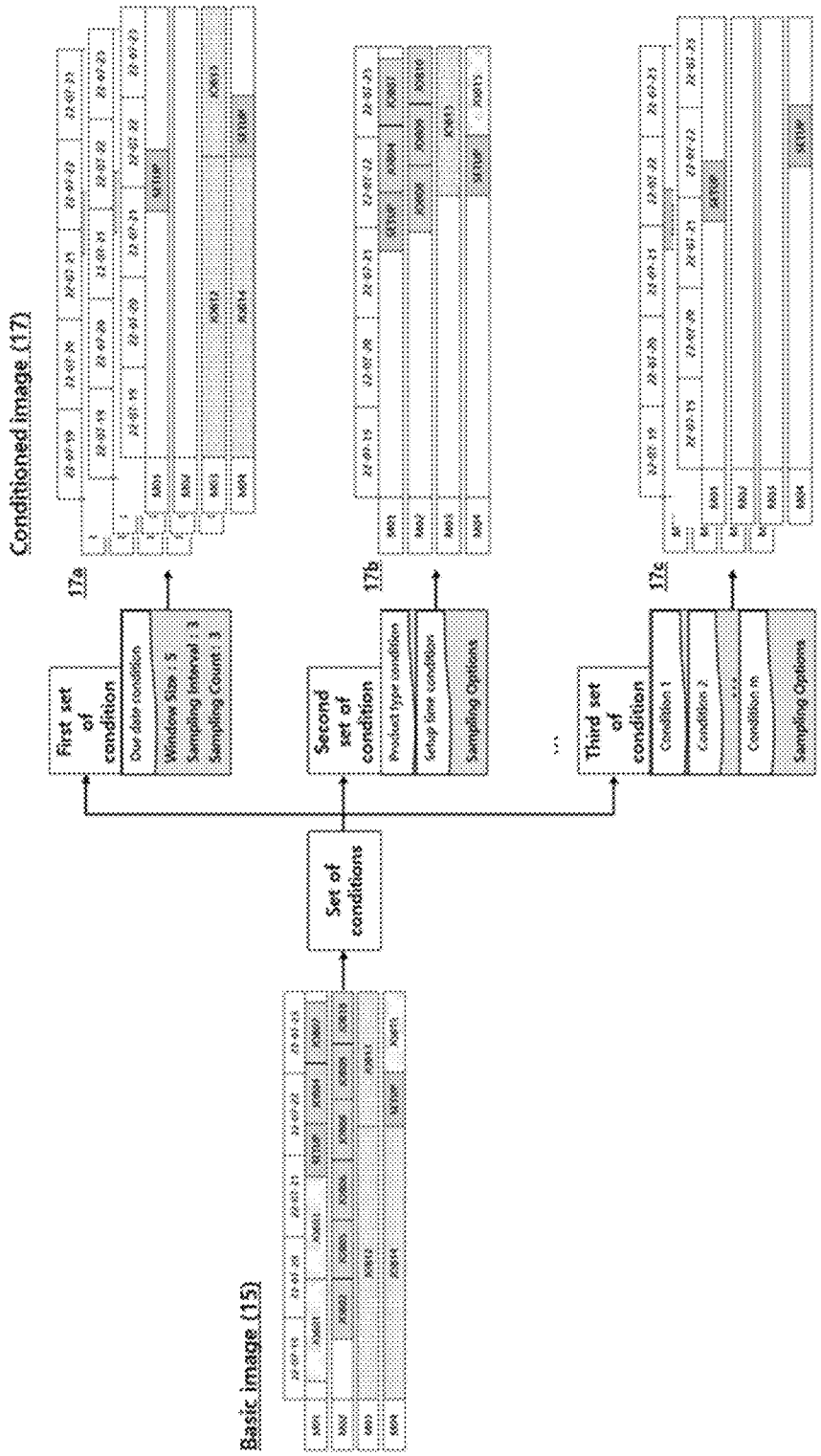
FIG. 3 is an example diagram of one or more conditioned images generated by a conditioned image generator of a manufacturing system state image preprocessing device in accordance with one embodiment of the present disclosure.

FIG. 3 is an example diagram of one or more conditioned images generated by a conditioned image generator of a manufacturing system state image preprocessing device in accordance with one embodiment of the present disclosure.

Referring to FIGS. 1 and 3, the conditioned image generator 14 may generate one or more conditioned images 17 by applying a set of conditions to the basic image 15. The set of conditions may be included in the input parameters 35, or may be inputted separately by the user. If there is no separate input, one or more default sets of conditions may be applied. According to one embodiment, the set of conditions may include at least one of a product type condition, a due date condition, and a setup time condition.

The example in FIG. 3 shows an example in which a first conditioned image set 17*a*, a second conditioned image set 17*b*, and a third conditioned image set 17*c* have been generated by applying a plurality of sets of conditions to the basic image 15 at a particular time point. Each set of conditions may include a plurality of conditions, and each conditioned image set 17*a*, 17*b*, and 17*c* may include a plurality of conditioned images in which a plurality of conditions has been applied to the basic image 15. Specifically, for the first conditioned image set 17*a*, the conditions of a window size of 5, a sampling interval of 3, and a sampling count of 3 have been applied to the basic image 15. As a result, the first conditioned image set 17*a* may include three conditioned images. And jobs other than the window size, sampling interval, and sampling count may all be filtered out (i.e., removed). For the second conditioned image set 17*b*, a due date condition has been applied to the basic image 15, and it can be seen that JOB04, JOB07 to JOB10, JOB13, and JOB15, which are jobs whose due dates are after 22 Jul. 22, i.e., Jul. 22, 2022, are included in the Gantt chart, and the rest of the jobs have all been filtered out except for the setup time. In the third conditioned image set 17*c*, a setup time condition and a sampling condition have been applied, and jobs other than the setup time and sampling conditions have all been filtered out. However, the type and number of one or more conditioned images 17 generated may vary depending on the design of the manufacturing system state image preprocessing device 10 and the DEVS-based manufacturing system simulation device 20, and are not limited thereto.

The manufacturing system state image preprocessing device 10 in accordance with one embodiment of the present disclosure has the effect of enabling a dispatching strategy to be implemented more efficiently in the environment within the manufacturing system via an image analysis-based artificial neural network module in the DEVS-based manufacturing system simulation device by performing an image preprocessing process to generate a basic image that visually represents the manufacturing system state and one or more conditioned images and providing the preprocessed images (conditioned images and/or basic image) to the DEVS-based manufacturing system simulation device. Further, when utilizing Gantt chart images, it is even possible to make decisions without using particular dispatching rules. In addition, Gantt chart images may be utilized for various purposes, such as simulating manufacturing system states or performing anomaly detection, and there is no limitation in its uses.

According to one embodiment of the present disclosure, the output image(s) 40 may be generated, processed, stored, or transferred not only at a time point after the end of the manufacturing system simulation but also at time points during the manufacturing system simulation. For example, the manufacturing system state image preprocessing device 10 may generate or process the output image(s) 40 including the basic image 15 generated by extracting the Gantt chart image and/or the conditioned images 17 generated by applying conditions to the basic image 15, store them in the file system 50, or transfer them to the DEVS manufacturing system simulation device 20 at a particular time point when a program related to the manufacturing system simulation is running on the memory of the DEVS manufacturing system simulation device 20. Here, the particular time point may be determined by preset conditions, user input, or the like.

With such a characteristic configuration, one embodiment of the present disclosure can obtain explanatory power that can be extracted from the corresponding information in an AI-based artificial intelligence decision-making device or the like that receives manufacturing system state image information as an input value, compared to the case where the output image(s) 40 are generated, processed, stored, or transferred only at a time point after the end of the manufacturing system simulation. In addition, the use of the Gantt chart images is not limited to the post-analysis of usual scheduling results, but can be expanded to continuous analysis that allows interaction even during the execution of a running program (simulation). In this regard, the basic image 15 including the Gantt chart image and the output image(s) 40 including the same in accordance with the present disclosure have a data structure for extracting information from the running simulation. By having such a data structure, it allows extraction and utilization in real time from the corresponding information in an AI-based artificial intelligence decision-making device or the like.

According to one embodiment of the present disclosure, the output image(s) 40 may indicate not only the manufacturing system state at the time point the output image(s) 40 are generated but also the state at a future time point. For example, the manufacturing system state image preprocessing device 10 may generate the basic image 15 based on a virtual Gantt chart image so as to include a manufacturing system state that reflects decision-making expected to occur in the future later than a particular time point when a program related to the manufacturing system simulation is running on the memory of the DEVS manufacturing system simulation device 20, at that particular time point. The virtual Gantt chart image may be related to predicting a virtual future manufacturing system state by fixing the time at an arbitrary time point during the simulation in the DEVS manufacturing system simulation device 20 and then virtually creating the flow of jobs and decision-making. The time elapsed in the virtual Gantt may not affect the time flow of the main simulation in the DEVS manufacturing system simulation device 20.

In the virtual Gantt chart image, the temporal distance between a particular time point under simulation in the DEVS manufacturing system simulation device 20 and a future time point for the virtual Gantt may be determined by user input, a preset algorithm, an artificial intelligence learning model, or a combination thereof. For example, as the temporal distance increases, a greater amount of computation is required for virtual decision-making, which may increase the load on the manufacturing system state image preprocessing device 10.

In addition, the manufacturing system state image preprocessing device 10 may generate or process the output image(s) 40 including the basic image 15 based on the virtual Gantt chart image and/or the conditioned images 17 generated by applying conditions to the basic image 15, and transfer them to the DEVS manufacturing system simulation device 20. There is an advantage that a future manufacturing system state expected at the time point of decision-making can be used as an input value in the DEVS manufacturing system simulation device 20 by using the basic image 15 based on the virtual Gantt chart image or output image(s) 40. As a result, it is possible to obtain a technical effect of being able to obtain a greater amount of information when evaluating a state created by virtual decision-making.

Operating Principle of Artificial Neural Network Module of DEVS Manufacturing System Simulation Device Reinforcement learning (RL) is one area of machine learning (ML), and corresponds to a learning method in which an agent defined in a given environment recognizes the current state and selects an action or action sequence that maximizes the reward out of selectable actions.

An agent refers to a subject that observes a state and chooses an action, an environment changes its state through interaction and provides rewards when the agent takes an action, a state refers to information that represents the current state of the environment, an action refers to what the agent does in the current state, and rewards correspond to information that expresses whether an action is good or bad. Here, the rewards must be matched well with a single or a plurality of objectives to be improved, and the state must represent the environment well.

Figure 4:
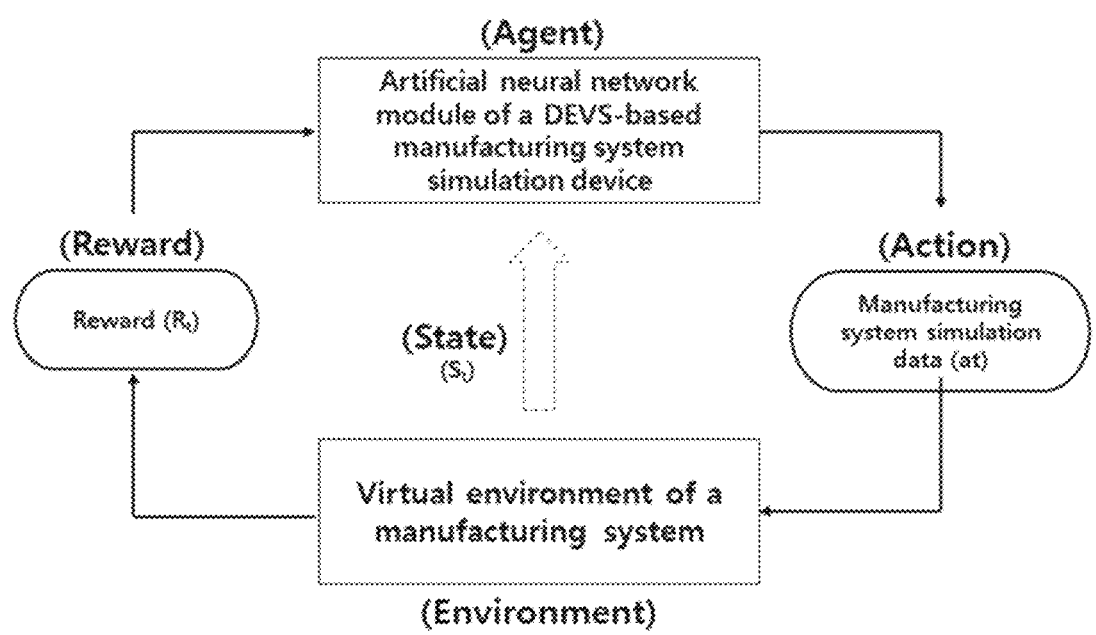
FIG. 4 is a diagram schematically showing the operating principle of a reinforcement learning-based artificial neural network module of a DEVS manufacturing system simulation device in accordance with one embodiment of the present disclosure.

FIG. 4 is a diagram schematically showing the operating principle of a reinforcement learning-based artificial neural network module of a DEVS manufacturing system simulation device in accordance with one embodiment of the present disclosure.

Referring to FIG. 4, reinforcement learning may be performed such that an artificial neural network module of the DEVS-based manufacturing system simulation device that is an agent Agent in a virtual environment Environment of a manufacturing system recognizes at least one of the output image(s) (i.e., at least one of the basic image and the conditioned images) and the dispatching rules as a state State ($S_t$) and generates selectable actions Action ($a_t$), i.e., manufacturing system simulation data, to maximize rewards Reward ($R_t$). According to a non-limiting example, the virtual environment of the manufacturing system may be created through digital twin technology, and the digital twin is a technology that predicts results in advance by creating a twin of a virtual reality world for a manufacturing system (i.e., implementing the manufacturing system identically in the virtual reality world) and simulating with computers the states that may occur in a real-world manufacturing system.

Specifically, the artificial neural network module of the DEVS-based manufacturing system simulation device, which is the agent Agent, is the subject that observes the state State (i.e., output image(s) and/or dispatching rules) of the virtual environment Environment of the implemented manufacturing system and selects an action Action ($a_t$) (i.e., generates manufacturing system simulation data), and the results generated by the manufacturing system simulation data generated for the virtual environment Environment of the manufacturing system are compared with the resulting data such as the ratio of the setup time and the processing speed that occur in the actual driving state of the manufacturing system, and as a result of the comparison, whether to provide a reward Reward ($R_t$) or the size of the reward may be determined. As one example, if the difference between the result of the manufacturing system simulation data and the resulting data of the actual driving state of the manufacturing system is within a threshold, a reward may be provided, and if the difference between the two data is greater than the threshold, no reward may be provided. In this way, reinforcement learning for the agent can be performed by repeating the process in which the agent generates manufacturing system simulation data in a direction that maximizes rewards. Accordingly, the artificial neural network module of the DEVS-based manufacturing system simulation device, which is the agent, will be able to generate optimized manufacturing system simulation data.

That is, as the reinforcement learning-based artificial neural network module of the DEVS manufacturing system simulation device in accordance with one embodiment of the present disclosure receives the basic image 15 consisting of a Gantt chart as input, and such a Gantt chart visually and geometrically expresses for which jobs each equipment in the manufacturing system performs processes by time and/or has occurred at setup times, it has the effect of being able to generate optimized manufacturing system simulation data by taking into account the case where it can be seen that jobs proceed well if a subsequent process can follow immediately after the previous process is completed, the case where a setup does not occur if processed on another equipment, and the like as the artificial neural network module provided with such a basic image and dispatching rules as input processes these input data.

On the other hand, as described above, the state State of the virtual environment Environment of the manufacturing system may include not only output image(s) but also dispatching rules. The dispatching rules here may include at least one of a FIFO (first in, first out: jobs that arrive earlier than other jobs are processed first) rule, an SPT (shortest processing time)/LPT (longest processing time) (jobs with shorter/longer processing times than other jobs are processed first) rule, a setup (jobs that cause setup changes are not processed first) rule, a required Eqd (jobs are processed based on the ratio of equipment with tool settings for the jobs relative to the total number of pieces of equipment at the current station) rule, a queue time (jobs closer to a predefined queue time limit are processed first) rule, a target data (jobs closer to a predefined deadline are processed first) rule, and a layer change (jobs are not processed first if they cause layer changes) rule. Since customer demands or product/job characteristics are different for each type of product or job, one or more dispatching rules may be applied to each product or job, and if a plurality of dispatching rules is applied, their priorities may be set differently. However, the above dispatching rules are merely examples and other rules may also be utilized.

Figure 5:
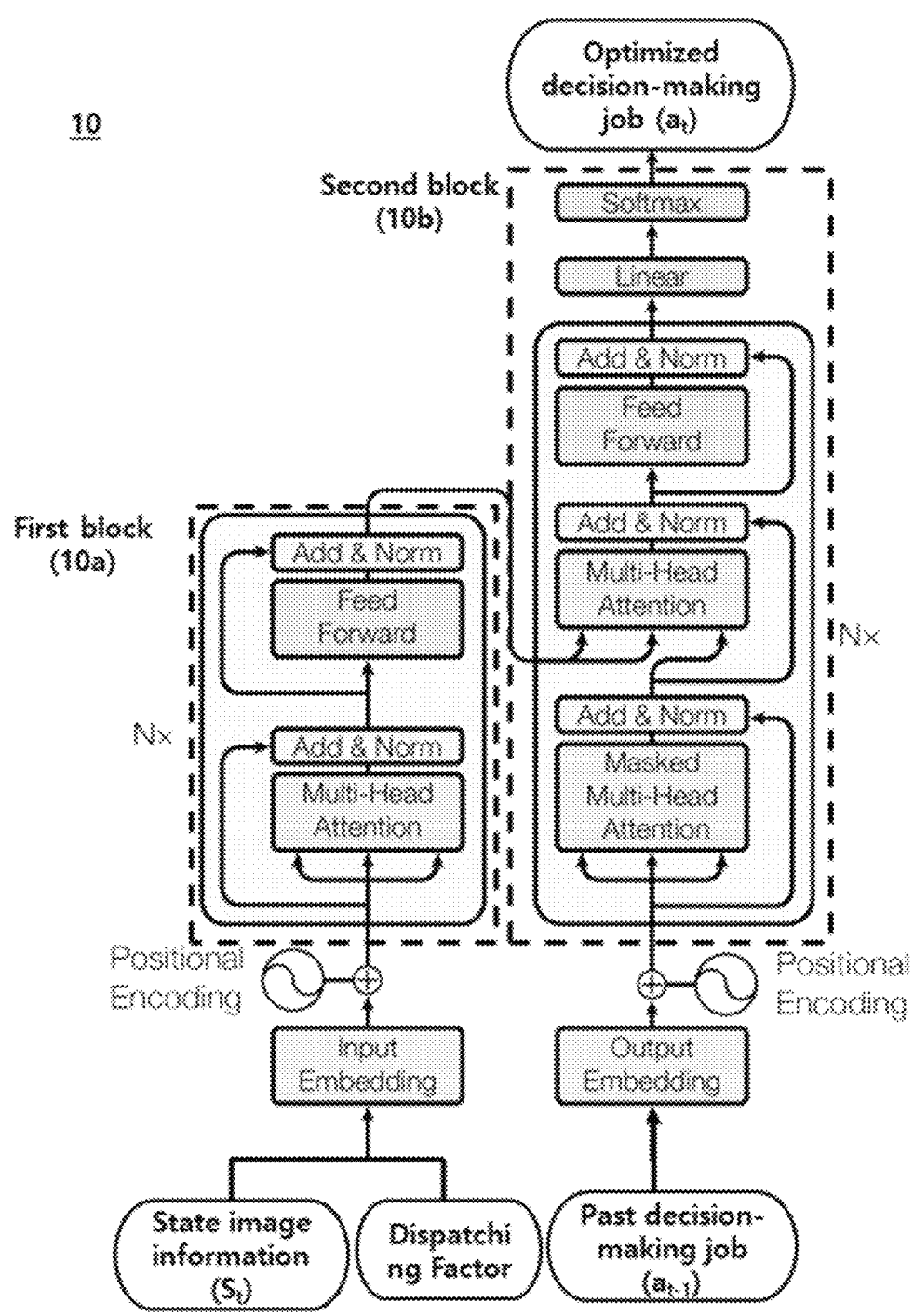
FIG. 5 is a diagram schematically showing an example structure of a transformer-based artificial neural network module for reinforcement learning of a DEVS manufacturing system simulation device in accordance with one embodiment of the present disclosure.

FIG. 5 is a diagram schematically showing an example structure of a transformer-based artificial neural network module for reinforcement learning of a DEVS manufacturing system simulation device in accordance with one embodiment of the present disclosure.

Referring to FIG. 5, the DEVS manufacturing system simulation device may include a transformer-based artificial neural network module 10, and output an optimal decision-making job a t through reinforcement learning using the artificial neural network module 10.

A dispatching factor, state image information (e.g., output images) $S_t$ representing the state State of the manufacturing system Environment, and a past decision-making job $a_{t-1}$, which is the result outputted previously from the artificial neural network module 10, may be inputted to the transformer-based artificial neural network module 10.

The state image information $S_t$ may include an output image (including at least one of a basic image and a conditioned image) generated from the manufacturing system state data of the current manufacturing system.

The past decision-making job $a_{t-1}$ represents an output that was outputted previously from the transformer-based artificial neural network module 10 if input/output to/from the transformer-based artificial neural network module 10 is performed in real time or time series.

In this way, when the dispatching factor, the state image information $S_t$, and the past decision-making job $a_{t-1}$ are inputted to the transformer-based artificial neural network module 10, the transformer-based artificial neural network module 10 may generate and output an optimal decision-making job $a_t$ selected at the present time point in the DEVS manufacturing system simulation device.

In the following, a process of processing input data and outputting result values via the transformer-based artificial neural network module 10 of the DEVS manufacturing system simulation device will be described.

Referring to FIG. 5, according to one embodiment of the present disclosure, the transformer-based artificial neural network module 10 of the DEVS manufacturing system simulation device may include a first block 10a (e.g., an encoder) and a second block 10b (e.g., a decoder).

The dispatching factor and the state image information $S_t$ may be inputted to the first block 10a of the artificial neural network module 10. And the dispatching factor and the state image information $S_t$ inputted in this way are inputted to an embedding module of the first block 10a and vectorized, thereby outputting embedding information, the bundle of outputted embedding information is linearly embedded through different linear layers and is configured into Q (query feature), K (key feature), and V (value feature) including feature dimensions, and then the Q (query feature), K (key feature), and V (value feature) may be used as input data for the multi-head attention layer. The Q, K, and V may be generated from the embedding information through different linear embeddings. The Q and K may be inputted as input data for the 1st MatMul operation, the similarity for all K with respect to Q may be computed through scale and softmax operations, and a similarity vector between a series of embedding information may be outputted, and this similarity vector and V may be inputted as input data for the 2nd MatMul operation. Then, the multi-head attention layer may output attention information based on the inputted Q, K, and V values and input it to the feed forward layer. These multi-head attention layers and feed forward layers may be repeated N times, and the repetition may be made in such a way that the encoding information outputted from the previous feed forward layer becomes the input to the next multi-head attention layer. And the last feed forward layer may output the final encoding information, and this final encoding information may be inputted as K (Key) and V (Value) values to the second multi-head attention layer of the second block 10b of the transformer-based artificial neural network module 10.

Further, the past decision-making job $a_{t-1}$ may be inputted to the second block 10b of the transformer-based artificial neural network module 10. Here, the past decision-making job $a_{t-1}$ is inputted to an embedding module of the second block 10b and vectorized, thereby outputting embedding information, the bundle of outputted embedding information is linearly embedded through different linear layers and is configured into Q (query feature), K (key feature), and V (value feature) including feature dimensions, and then the Q (query feature), K (key feature), and V (value feature) may be used as input data for the first multi-head attention layer. And the first multi-head attention layer may output a Q (Query) value, and this Q value is inputted to the second multi-head attention layer. The second multi-head attention layer may receive the final encoding information from the first block 10a as K and V values. Then, the second multi-head attention layer may output attention information based on the inputted Q, K, and V values and input it to the feed forward layer. These first multi-head attention layers, second multi-head attention layers, and feed forward layers may be repeated N times, and the repetition may be made in such a way that the decoding information outputted from the previous feed forward layer becomes the input to the next first multi-head attention layer. And the last feed forward layer may output the final decoding information, and as this final decoding information may pass through the linear layer and softmax layer, the transformer-based artificial neural network module 10 may generate and output an optimal decision-making job a t selected at the present time point in the DEVS manufacturing system simulation device.

However, the specific implementation method of the transformer-based artificial neural network module 10 as described above may vary in a variety of ways, and is not limited thereto. As one example, an additional artificial neural network module, such as a convolution neural network (CNN), may be combined with the transformer artificial neural network module 10 described above for image analysis of the output image(s) 40.

Manufacturing System State Image Preprocessing Method

FIG. 6 is a flowchart of a manufacturing system state image preprocessing method in accordance with one embodiment of the present disclosure. This manufacturing system state image preprocessing method may be performed by a processor or one or more modules implemented by the processor of a computing device or server device installed in a manufacturing system.

Referring to FIG. 6, first, in step S10, a basic image that visually represents a manufacturing system state may be generated based on manufacturing system state data received from the manufacturing system simulation device. At this time, the basic image may include a Gantt chart. The rows of the Gantt chart may represent equipment, the columns may represent time, and the respective bars included in the chart may correspond to jobs or setup times. That is, the basic image may represent for which jobs each equipment performs processes by time and/or has occurred at setup times.

In step S20, one or more conditioned images in which one or more sets of conditions have been applied to the basic image may be generated. The set of conditions may be included in the input parameters received from the user device, or may be inputted separately by the user. If there is no separate input, one or more default sets of conditions may be applied. According to one embodiment, the set of conditions may include at least one of a product type condition, a due date condition, and a setup time condition.

In step S30, output image(s) including at least one of the basic image and the one or more conditioned images may be transmitted to the manufacturing system simulation device.

Then, in step S40, the output image(s) transmitted to the manufacturing system simulation device may be provided as input to an artificial neural network module of the manufacturing system simulation device.

At this time, according to one embodiment, the artificial neural network module of the manufacturing system simulation device may be based on reinforcement learning. However, in addition to the reinforcement learning base, a pre-trained artificial neural network module may also be used and is not limited thereto.

Further, a decision-making job may be outputted based on at least one of the output image(s) (i.e., preprocessed manufacturing system state images) and dispatching rules provided as input to the artificial neural network module. In some cases, no dispatching rules other than the preprocessed manufacturing system state images may be necessary.

Moreover, in another example, it may be determined whether a manufacturing system schedule anomaly has occurred based on the output image(s) (i.e., preprocessed manufacturing system state images) provided as input to the artificial neural network module.

Computer-Readable Recording Medium

It will be apparent that each step or operation of the method in accordance with the embodiments of the present disclosure may be performed by a computer including one or more processors according to the execution of a computer program stored in a computer readable recording medium.

The computer-executable instructions stored on the recording medium described above may be implemented via a computer program programmed to perform each corresponding step, and such a computer program may be stored on a computer-readable recording medium and may be executed by a processor. The computer-readable recording medium may be a non-transitory readable medium. In this case, the non-transitory readable medium refers to a medium that stores data semi-permanently and is readable by a machine, rather than a medium that stores data for a short period of time, such as a register, cache, memory, or the like. Specifically, programs for performing the various methods described above may be stored and provided in a non-transitory readable medium such as a non-volatile memory and the like, including semiconductor memory devices such as erasable programmable read-only memory (EPROM), electrically erasable programmable read-only memory (EEPROM), and flash memory devices, magnetic disks such as internal hard disks and removable disks, opto-magnetic disks, and CD-ROM and DVD-ROM disks.

Methods in accordance with various examples disclosed herein may be included and provided in a computer program product. The computer program product may be distributed in the form of a machine-readable storage medium (e.g., compact disc read-only memory (CD-ROM)) or online via an application store (e.g., Play Store™). In the case of online distribution, at least part of the computer program product may be stored at least temporarily or generated tentatively on a storage medium such as memory of a manufacturer's server, an application store server, or a relay server.

As described above, those of ordinary skill in the art to which the present disclosure pertains will understand that the present disclosure may be embodied in other specific forms without changing its technical idea or essential features. Therefore, it should be understood that the embodiments described above are illustrative in all respects and not intended to be limiting. The scope of the present disclosure is indicated by the following claims rather than by the detailed description, and all changes or variations derived from the meaning and scope of the claims and equivalent concepts should be construed as falling within the scope of the present disclosure.

The features and advantages described herein are not exhaustive, and in particular, many additional features and advantages will become apparent to those of ordinary skill in the art upon consideration of the drawings, specification, and claims. Moreover, it should be noted that the language used herein has been chosen primarily for ease of reading and for the purpose of teaching, and may not be chosen to depict or limit the subject matter of the present disclosure.

The foregoing description of embodiments of the present disclosure has been presented for purposes of illustration. This is not intended to limit the present disclosure to the exact form disclosed or to make it without omission. Those of ordinary skill in the art can appreciate that many modifications and variations are possible in light of the above disclosure.

Therefore, the scope of the present disclosure is not limited by the detailed description, but rather by any claims of the application based thereon. Accordingly, the disclosure of the embodiments of the present disclosure is illustrative and does not limit the scope of the present disclosure set forth in the claims below.

DESCRIPTION OF REFERENCE NUMERALS AND SYMBOLS

10: Manufacturing system state image preprocessing device
12: Basic image generator
14: Conditioned image generator
15: Basic image
17: Conditioned image
20: DEVS-based manufacturing system simulation device
25: Manufacturing system state data
27: Manufacturing system production plan (schedule) data
30: User device
35: Input parameters
40: Output image(s)
50: File system

What is claimed is:

1. A manufacturing system state image preprocessing device comprising:
at least one processor and a non-transitory memory storing instructions that, when executed by the at least one processor, cause the at least one processor to:
generate a basic image that visually represents a manufacturing system state based on manufacturing system state data, wherein the basic image comprises a plurality of Gantt chart images generated based on input parameters and sampled at several time points;
generate one or more conditioned images in which one or more sets of conditions have been applied to the basic image, and
transmit, in an in-memory data-transfer manner, an output image comprising at least one of the basic image and the one or more conditioned images to a simulation device during execution of manufacturing system simulation,
wherein the simulation device utilizes the output image in real time during the manufacturing system simulation,
wherein an artificial neural network module of the simulation device performs reinforcement learning or decision-making using the output image as input and outputs manufacturing system production plan data to a scheduler for assigning jobs in the manufacturing system production plan data to pieces of equipment in the manufacturing system, and
wherein the input parameters comprise a sampling interval parameter indicative of a time interval at which samples are extracted to sample the Gantt chart images at several time points and a sampling count parameter that specifies how many times the Gantt chart images are to be extracted at a sampling interval.

2. The manufacturing system state image preprocessing device of claim 1, wherein each row of a Gantt chart represents equipment, columns of the Gantt chart represent time, and each of a plurality of bars included in the Gantt chart comprises at least one of a job and a setup time.

3. The manufacturing system state image preprocessing device of claim 2, wherein the Gantt chart of the basic image is displayed to include three or more colors, and
the Gantt chart of the one or more conditioned images is displayed to include two colors.

4. The manufacturing system state image preprocessing device of claim 1, wherein the one or more sets of conditions comprise at least one of a product type condition, a due date condition, and a setup time condition, and
the one or more conditioned images comprise at least one of a first conditioned image in which the product type condition has been applied and the rest of the conditions have been filtered out, a second conditioned image in which the due date condition has been applied and the rest of the conditions have been filtered out, and a third conditioned image in which the setup time condition has been applied and the rest of the conditions have been filtered out.

5. The manufacturing system state image preprocessing device of claim 1, wherein the input parameters further comprise a window size parameter for defining a size of a Gantt chart image for the basic image.

6. The manufacturing system state image preprocessing device of claim 1, wherein the at least one processor further generates a plurality of conditioned image sets in which a plurality of sets of conditions has been applied to the basic image at a particular time point,
each of the plurality of sets of conditions comprises a plurality of conditions, and
each of the plurality of conditioned image sets comprises a plurality of conditioned images in which the plurality of conditions has been applied.

7. A computer-implemented method comprising:
generating a basic image that visually represents a manufacturing system state based on manufacturing system state data, wherein the basic image comprises a plurality of Gantt chart images generated based on input parameters and sampled at several time points;
generating one or more conditioned images in which one or more sets of conditions have been applied to the basic image; and
transmitting, in an in-memory data-transfer manner, an output image comprising at least one of the basic image and the one or more conditioned images to a simulation device during execution of manufacturing system simulation,
wherein the simulation device utilizes the output image in real time during the manufacturing system simulation,
wherein an artificial neural network module of the simulation device performs reinforcement learning or decision-making using the output image as input and outputs manufacturing system production plan data to a scheduler for assigning jobs in the manufacturing system production plan data to pieces of equipment in a manufacturing system, and
wherein the input parameters comprise a sampling interval parameter indicative of a time interval at which samples are extracted to sample the Gantt chart images at several time points and a sampling count parameter that specifies how many times the Gantt chart images are to be extracted at a sampling interval.

8. The method of claim 7, wherein each row of a Gantt chart represents equipment, columns of the Gantt chart represent time, and each of a plurality of bars included in the Gantt chart comprises at least one of a job and a setup time.

9. The method of claim 7, wherein the one or more sets of conditions comprise at least one of a product type condition, a due date condition, and a setup time condition, and
the one or more conditioned images comprise at least one of a first conditioned image in which the product type condition has been applied and the rest of the conditions have been filtered out, a second conditioned image in which the due date condition has been applied and the rest of the conditions have been filtered out, and a third conditioned image in which the setup time condition has been applied and the rest of the conditions have been filtered out.

10. The method of claim 7, wherein the input parameters further comprise a window size parameter for defining a size of a Gantt chart image for the basic image.

11. The method of claim 7, wherein the generating the one or more conditioned images comprises:
generating a plurality of conditioned image sets in which a plurality of sets of conditions has been applied to the basic image at a particular time point, and
wherein each of the plurality of sets of conditions comprises a plurality of conditions, and
each of the plurality of conditioned image sets comprises a plurality of conditioned images in which the plurality of conditions has been applied.

12. A manufacturing system state simulation system comprising:
a simulation device comprising at least one processor and a non-transitory memory storing instructions that, when executed by the at least one processor, cause the at least one processor to: generate manufacturing system state data indicative of a progress state of processes performed by a number of pieces of equipment in a manufacturing system and generate manufacturing system production plan data for simulating a workflow of the manufacturing system; and a manufacturing system state image preprocessing device comprising at least one processor and a non-transitory memory storing instructions that, when executed by the at least one processor, cause the at least one processor to: te generate a basic image that visually represents a manufacturing system state based on the manufacturing system state data received from the simulation device, wherein the basic image comprises a plurality of Gantt chart images generated based on input parameters and sampled at several time points; generate one or more conditioned images in which one or more sets of conditions have been applied to the basic image; and transmit, in an in-memory data-transfer manner, an output image comprising at least one of the basic image and the one or more conditioned images to the simulation device during execution of manufacturing system simulation, wherein the simulation device utilizes the output image in real time during the manufacturing system simulation, wherein an artificial neural network module of the simulation device performs reinforcement learning or decision-making using the output image as input and outputs the manufacturing system production plan data to a scheduler for assigning jobs in the manufacturing system production plan data to pieces of equipment in the manufacturing system, and wherein the input parameters comprise a sampling interval parameter indicative of a time interval at which samples are extracted to sample the Gantt chart images at several time points and a sampling count parameter that specifies how many times the Gantt chart images are to be extracted at a sampling interval.

13. The manufacturing system state simulation system of claim 12, wherein the artificial neural network module of the simulation device is based on reinforcement learning, and outputs the manufacturing system production plan data based on at least one of the output image and dispatching rules provided as input to the artificial neural network module.

14. The manufacturing system state simulation system of claim 13, wherein the dispatching rules comprise at least one of:

a FIFO (first in, first out) rule, which is a rule that processes jobs that arrive earlier than other jobs first;

an SPT (shortest processing time)/LPT (longest processing time) rule, which is a rule that processes jobs with shorter/longer processing times than other jobs first;

a setup rule, which is a rule that does not process jobs that cause setup changes first;

a required Eqd rule, which is a rule that processes jobs based on the ratio of equipment with tool settings for the jobs relative to a total number of pieces of equipment at a current station;

a queue time rule, which is a rule that processes jobs closer to a predefined queue time limit first;

a target data rule, which is a rule that processes jobs closer to a predefined deadline first; and a layer change rule, which is a rule that does not process jobs first if the jobs cause layer changes.

15. The manufacturing system state simulation system of claim 12, wherein the one or more sets of conditions comprise at least one of a product type condition, a due date condition, and a setup time condition, and the one or more conditioned images comprise at least one of a first conditioned image in which the product type condition has been applied and the rest of the conditions have been filtered out, a second conditioned image in which the due date condition has been applied and the rest of the conditions have been filtered out, and a third conditioned image in which the setup time condition has been applied and the rest of the conditions have been filtered out.

16. The manufacturing system state simulation system of claim 12, wherein the input parameters further comprise a window size parameter for defining a size of a Gantt chart image for the basic image.

* * * * *